Nov. 22, 1966  E. A. BUTNER ETAL  3,286,602
MECHANICAL ACTUATOR
Filed Nov. 22, 1963  4 Sheets-Sheet 1
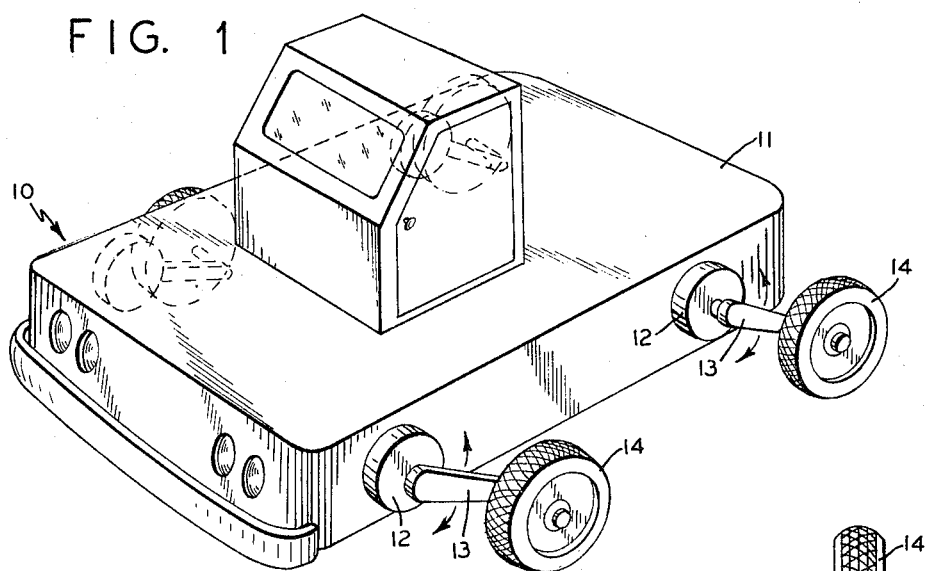
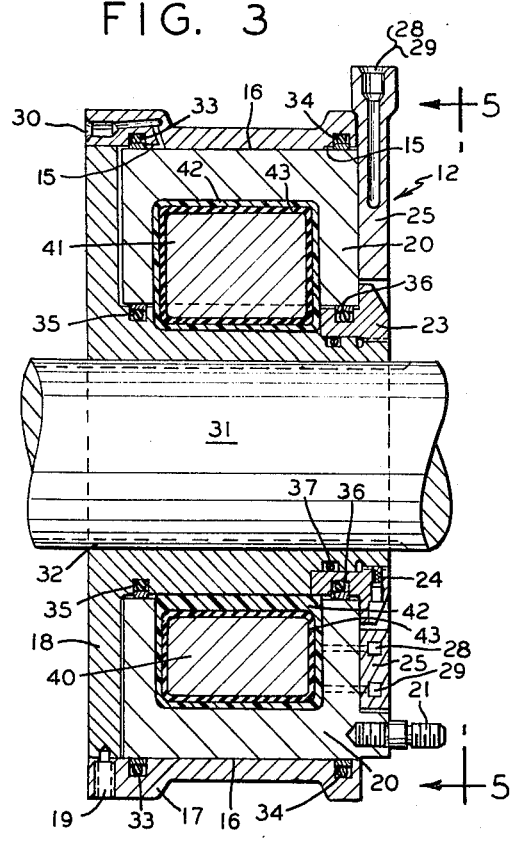
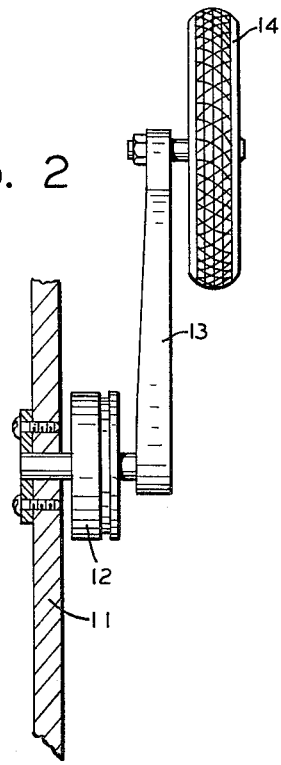
EDGAR A. BUTNER
JOSEPH E. SCERBO
ROY B. JOHNSON
*INVENTORS.*
BY
*Arthur J. Plantamura*
ATTORNEY.

Nov. 22, 1966   E. A. BUTNER ETAL   3,286,602
MECHANICAL ACTUATOR

Filed Nov. 22, 1963   4 Sheets-Sheet 2

EDGAR A. BUTNER
JOSEPH E. SCERBO
ROY B. JOHNSON
*INVENTORS.*

BY
*Arthur J. Plantamura*
ATTORNEY.

Nov. 22, 1966  E. A. BUTNER ETAL  3,286,602
MECHANICAL ACTUATOR

Filed Nov. 22, 1963  4 Sheets-Sheet 3

EDGAR A. BUTNER
JOSEPH E. SCERBO
ROY B. JOHNSON
INVENTORS.

BY  *Arthur J. Plantamura*
ATTORNEY.

Nov. 22, 1966

E. A. BUTNER ETAL 3,286,602

MECHANICAL ACTUATOR

Filed Nov. 22, 1963

EDGAR A. BUTNER
JOSEPH E. SCERBO
ROY B. JOHNSON
INVENTORS.

BY

*Arthur J. Plantamura*

ATTORNEY.

United States Patent Office 3,286,602
Patented Nov. 22, 1966

3,286,602
MECHANICAL ACTUATOR
Edgar A. Butner, Scarsdale, N.Y., Joseph E. Scerbo, Stamford, Conn., and Roy B. Johnson, Larchmont, N.Y., assignors to American Machine & Foundry Company, a corporation of New Jersey
Filed Nov. 22, 1963, Ser. No. 325,572
2 Claims. (Cl. 92—28)

The present invention relates to actuator mechanisms and in particular to an actuator mechanism capable of providing rotary movement. More specifically, the invention relates to rotary actuator mechanisms having heavy duty capabilities and fail-safe characteristics, and which use interference fit locking and fluid pressure releasing cooperating components in the structure thereof.

In many machines of diverse kinds in the prior art there is a definite need for a mechanism which can impart rotary movement in an infinite number of angular increments. The need for such devices is especially pronounced in heavy duty units. It is important that such mechanisms have the capability of being securely locked at either extreme of the movements as well as at any of a wide range of intermediate positions. Also, because of hazards generally involved in the movement of heavy loads, the mechanism must necessarily have a fail-safe feature so that if the motive power used in uncoupling and/or rotating the actuator fails there is an automatic locking of the actuator against further relative movement of the coupling members of the actuator.

It is an object of the present invention to provide a highly reliable and rugged actuator mechanism which provides rotary movement in a smooth and dependable manner and allows the movement to be locked in an infinite number of positions.

It is another object of the invention to provide an apparatus which is dependably fail-safe so that upon the failure of the fluid power used to uncouple the relatively movable elements, the acuator through the coupling forces provided by an intereference fit is securely and dependably automatically locked against rotational forces which may be imposed on the actuator in either direction.

It is a further object of the invention to provide a fail-safe reliable actuator mechanism with rotary capability which can impart precise incremental movements to relatively heavy loads.

Additional objects, advantages and capabilities of the invention herein disclosed will become apparent from the following detailed description taken in conjunction with the accompanying drawing wherein:

FIG. 1 is a perspective diagram illustrating schematically a typical use for the actuator on a vehicle wherein the actuator is used to provide a variable ground clearance for a vehicle body.

FIG. 2 is an enlarged diagram illustrating schematically a fragment of the arrangement of FIG. 1 showing the connection of the actuator to the body and wheels of the vehicle.

FIG. 3 is a side elevational view in section, taken substantially along line 3—3 of FIG. 4, of one embodiment of an actuator with rotary movement capability constructed substantially in accordance with the invention.

Figure 4:
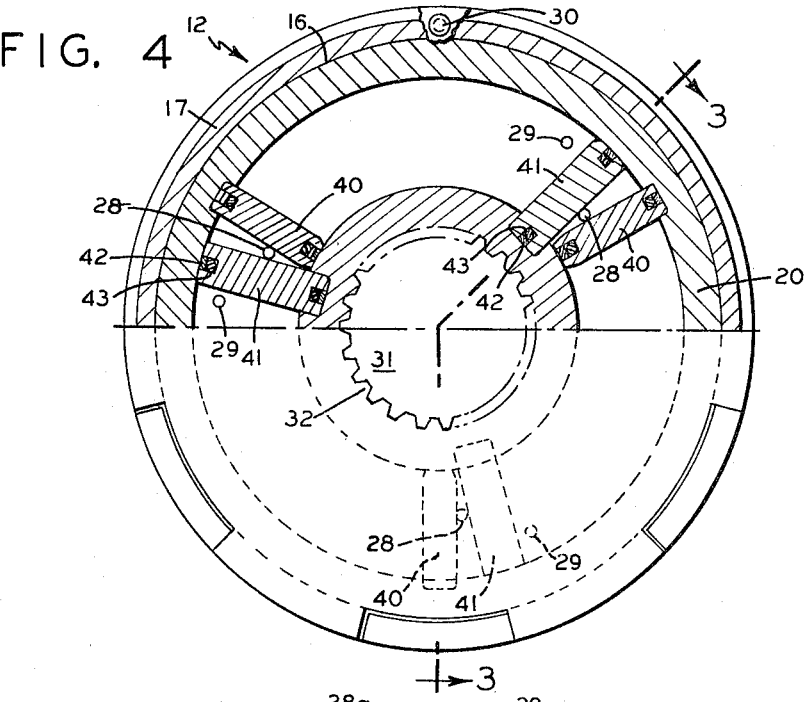
FIG. 4 is an end view of the actuator illustrating in detail the rotary and stationary vanes through which movement is effected.

A more detailed description of the improved rotary actuator will now be set forth by referring to the drawing. Referring to FIG. 1 of the drawing, a typical application for locking rotary actuator is presented. It will be understood, however, that the description of the actuator in connection with its use on a vehicle is for the purpose of giving an example of specific use of the actuator; this use is not intended as a limiting factor. As shown in FIG. 1, a perspective view of a vehicle 10 incorporating four locking rotary actuators 12 is depicted. The actuators 12 are suitably disposed between the arm 13 which supports wheels 14 and the chassis 11 of the vehicle. It will be apparent that any appropriate number of these actuators, acting independently or conjointly coordinated, may be installed on a vehicle of this type or similar character depending on the use and capabilities sought in the vehicle. For example a heavy duty military carrier for massive loads may comprise six or more pairs of wheel actuators of this kind.

Figure 5:
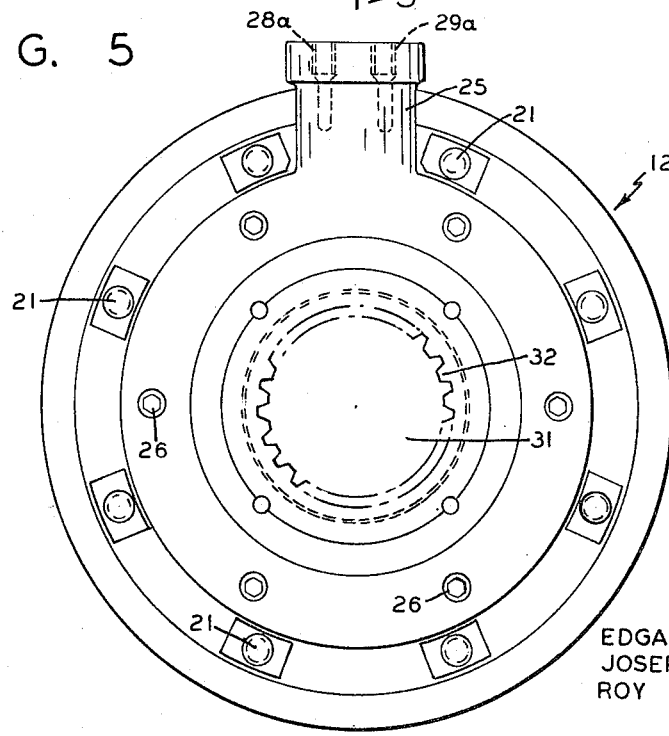
FIG. 5 is another end view of the actuator taken substantially along line 5—5 of FIG. 3.

The locking rotary actuators 12 described in greater detail in conjunction with FIGS. 3–5, are attached to the chassis 11 of the vehicle 10 using means known to those skilled in the art. Rigid rotatable wheel supporting arms 13 of any suitable construction and length are attached to the output end of the actuators 12. The support arms 13 are connected at the opposite end to the wheels 14. As can be seen within the contemplation of this arrangement, by rotating one or more of the actuators in a clockwise or counterclockwise fashion, respectively, the vehicle road clearance for the chasis 11 can be increased or decreased as desired. The rotary capability may include a resting of the chassis directly on the ground. The actuators can also be operated individually in their rotary movement for the purpose of positioning, i.e. adjusting the elevation of any part of athe chassis 11 as desired, as for example to accommodate for uneven terrain. With the actuators locked, a rigid road clearance is provided between the road contact under the wheels and the vehicle chassis.

In FIG. 2, the generally schematic arrangement of hardware for the application shown in FIG. 1 is shown in enlarged detail. The wheel 14 is attached to the support arm 13 which is connected to the output side of the locking rotary actuator 12. The fixed side of the rotary actuator 12 is appropriately attached to the vehicle chassis 11. For optimum construction and linking means for the vehicle, reference is made to the prior art of vehicle construction.

The essence of the invention resides in a novel arrangement for rotary actuators which utilizes an interference fit coupling to lock the rotary movement in an infinite number of positions. While the specification and figures of the drawing describe several means to effect the rotary motion after the actuator has been uncoupled or unlocked, any suitable alternate means, to produce the rotation known to those skilled in the art, may be adapted for use in connection with the interference fit bearing lock.

Referring particularly to FIG. 3, the arrangement comprises one or more paired sets 40 and 41 of vane-like structures used to effect the rotary motion after the bearing surface at 16 has been uncoupled. One vane 41 of each pair is stationary while the other 40 is rotatable. The unit is provided with releaseable locking means comprising an interference fit coupling at the interface 16, hereinafter described in greater detail, which is uncoupled using fluid pressure and thereafter rotary movement is effected between the movable and stationary vanes by any appropriate means, as for example by introducing fluid pressure at 29, until the desired rotary position is reached. Thereafter the interference coupling is re-engaged by relieving the fluid pressure at the interface 16.

In FIG. 4, the end view of an actuator which employs three pairs of vane-like elements referred to as rotary and stationary vanes 40 and 41, respectively, are shown. Hydraulic ports 28 and 29 furnish the fluid pressure to move the rotatable vanes 40 clockwise and counterclockwise, respectively.

Referring in more detail to the various component parts, the locking rotary actuator is comprised or a stationary member of segment 18, which may also be referred to as a stator, and a relatively movable rotary member or segment 20, which may also be referred to as the rotor. Integrally formed as a part of, or affixed in a suitable manner to, stationary member 18 is an annular segment or sleeve 17. As shown, the sleeve 17 is separately formed and arranged in such a manner that it is affixed to member 18 through a conventional key and set screw fastening arrangement 19. However, where practical, the sleeve portion 17 may be integrally formed wth member 18. Additionally where desirable or advantageous, sleeve portion 17 may contain a bushing of the same or different material secured to the interior of sleeve 17. The sleeve portion 17 of the stator 18 and rotary member 20 are arranged to have an interference fit bearing surface 16 between the inner periphery of sleeve 17 and outer periphery of rotor 20. The locking engagement at 16 formed by the interference fit is disengaged or uncoupled to provide a bearing surface when fluid pressure is introduced at the interface. The fluid pressure expands sleeve 17 within the elastic limit of the material forming sleeve 17. The interfering relationship machined into the sleeve 17 and member 20 is such that when the interface at 16 is unpressurized, or if pressurized and the pressure fails, the sleeve 17 is locked on the inner member 20. The bearing or coupling at the bearing surface 16 is readily releasable by introducing and confining fluid pressure at the interface 16. Port 30 is employed as the external inlet for uncoupling pressure fed to interface 16. To provide rotational movement for vane 40, fluid pressure introduced through port 28 is employed.

To contain the fluid introduced at 30, for the purpose of expanding the interface 16 and thereby provide a bearing surface at 16, dynamic seals 33 and 34 are provided. Preferably an annular clearance 15 adjacent and between seals 33 and 34 are provided for improved uniformity and efficiency of fluid distribution. For a more detailed discussion of the arrangement assembly and operation of the interference fit bearing-lock per se, reference is made to the copending application of B. Frassetto et al., S.N. 280,355, filed on May 14, 1963, now Patent 3,150,571. The rotary segment or rotor 20 is located within the bearing-lock sleeve 17 of the stationary member 18 and is restrained against lateral movement by any suitable means. As shown, the lateral holding means comprises a lock nut 23. Three stationary vanes 40 are suitably mounted on, or formed as a part of, the stationary member 18. Mounting of the rotor 20 within stator 18 may be effected in any appropriate manner as by press fitting. In a like manner, the three rotary vanes 40 may be, and as shown are, attached to the rotary segment 20.

Dynamic seals 42 and 43 are provided on each of the vanes to provide sealing against interflow of pressurized fluid introduced between the vane sections of the actuator. The seal configuration may comprise any suitable arrangement such as a synthetic rubber O ring compressible type seal 43 of rubbery composition in combination with a flat bearing portion 42 formed from suitable composition such as a fluorocarbon resin, e.g. polytetrafluoroethylene available commercially as Teflon. The dynamic seals 42 and 43 are designed to provide sealing around the entire periphery of each vane to insure effective corner sealing and minimizes cross-vane leakage. Other seals employed, such as those referred to by numerals 33 through 37, may be similarly composed or may comprise alternate suitable configurations of kinds known to those skilled in the seal art.

While the element 18 to which shaft 31 is affixed is generally referred to as the relatively fixed segment and element 20 as the relatively rotatable part, it will be obvious the movement may be otherwise, i.e. part 18 may be considered as the rotatable part of the combination end member 20 as the relatively non-movable element.

It is thus seen that unless and until the bearing surface 16 is uncoupled or released, that is, until the outer peripheral surface of 20 is disengaged from the inner surface of the barrel or sleeve 17 by pressurized fluid introduced at port 30, the actuator is locked and pressure applied against its rotary vanes 40 is incapable of producing rotary movement of the rotor 20. In the engaged or locked condition the element 20 may not be rotated relative to shaft 31 coupled to fixed element 18. Once the interface 16 has been expanded by providing pressurized fluid at 30 and thereby separating the inner periphery of the outer bearing member 17 from the outer periphery of the inner bearing member 20, movement of the vanes 40 may be effected.

It will be apparent that while as a practical matter in most applications the outer sleeve is expanded under fluid pressure within its elastic limit to uncouple the interference fit, arrangements in which uncoupling occurs from the relatively greater resiliency or the inner member are within the contemplation of the present invention. The means shown to produce relative movement comprises introducing pressurized fluid through port 28 for clockwise movement. For counterclockwise movement, movement is effected by introducing fluid under pressure at port 29. When the actuator is moving clockwise, port 29 functions as a vent, whereas when the actuator is moved counterclockwise, port 28 serves as the vent. Means other than fluid may be used to move the relatively rotatable elements which have been uncoupled at the interference fit.

To contain the pressurized fluid which is employed in the arrangement illustrated thereby permitting rotational motion within the rotary section, dynamic seals 35 and 36, appropriately located, are used. Dynamic seal 35 is conveniently mounted in the stationary section while dynamic seal 36 is suitably mounted in the lock nut 23, which like the stator 18 is stationary. A static seal 37 is used to prevent fluid from leaking past the joint between the lock nut and the stationary section. Suitable means, such as set screw 24, is provided to assure that the lock nut 23 does not rotate with respect to the stator 18.

The stationary section 18 of the unit is attached to adjacent hardware, the shaft 31 in this case, by any suitable means such as a spline 32. The rotary section of the unit is attached to adjacent hardware by any suitable means such as conventional mounting studs 21. To rotate the stationary section with respect to the rotary section in a clockwise manner, hydraulic fluid is introduced at pressure port 28a. The fluid is then distributed to the three vane ports 28 by means of a hydraulic manifold 25 of conventional arrangement. Manifold 25 is attached to rotor 20 in any suitable manner as by screws. To obtain counterclockwise rotation, pressurized fluid is introduced at port 29a and distributed in like manner from 29 by hydraulic manifold 25.

The operation of the actuator is as follows:

In the at rest condition, that is, when no fluid pressure is applied through the bearing lock release port 30, the interference fit between members 17 and 20 securely interlocks these members. In this condition the bearing inner peripheral surface of sleeve 17 is contracted. The amount of force locking the surface of these members may be very substantial, although it may be varied and it is generally dependent on the extent of the interference in the fit. In order to uncouple this interference fit to provide a relatively free bearing surface at 16, fluid under pressure is introduced at the interface 16, i.e. between the members 17 and 20, thereby expanding sleeve 17. Sufficient pressure is employed through the fluid means to offset the force of this interference fit by expanding sleeve 17 within its elastic limit. The introduction of adequate pressurized fluid, e.g. hydraulic liquid, at this interface places the vanes 40 in a condition which allows relatively free movement. The movement of the vanes 40 is then effected by fluid pressure ported in at 28a or 29a. When pressure is delivered through the port 28a the actuator rotates clockwise. In this movement, port 29a is utilized as a vent. Conversely, when it is desired to rotate the actuator counterclockwise, the fluid pressure is introduced at 29a after uncoupling the bearing by delivering fluid pressure at port 30. In this latter operation, port 28a functions as a vent. At any stage of rotation of vane 40 pressure at 30 may be relieved so that the members 17 and 20 are interlocked at any angle of rotation in the arc through which relative movement is permitted.

The coordination of the valving arrangement for introducing fluid pressure at the various ports, i.e. at 30 to release the bearing surface 16, and at 28a and 29a to rotate the actuator, in the proper time sequence is effected by adapting any appropriate coordinating valve control system known to those skilled in the art. Reference to systems of this kind is made for example in the hereinabove referred to Patent 3,150,571. The fluid system preferably employed is hydraulic although adaptation of systems other than hydraulic e.g. pneumatic is not precluded.

Figure 6:
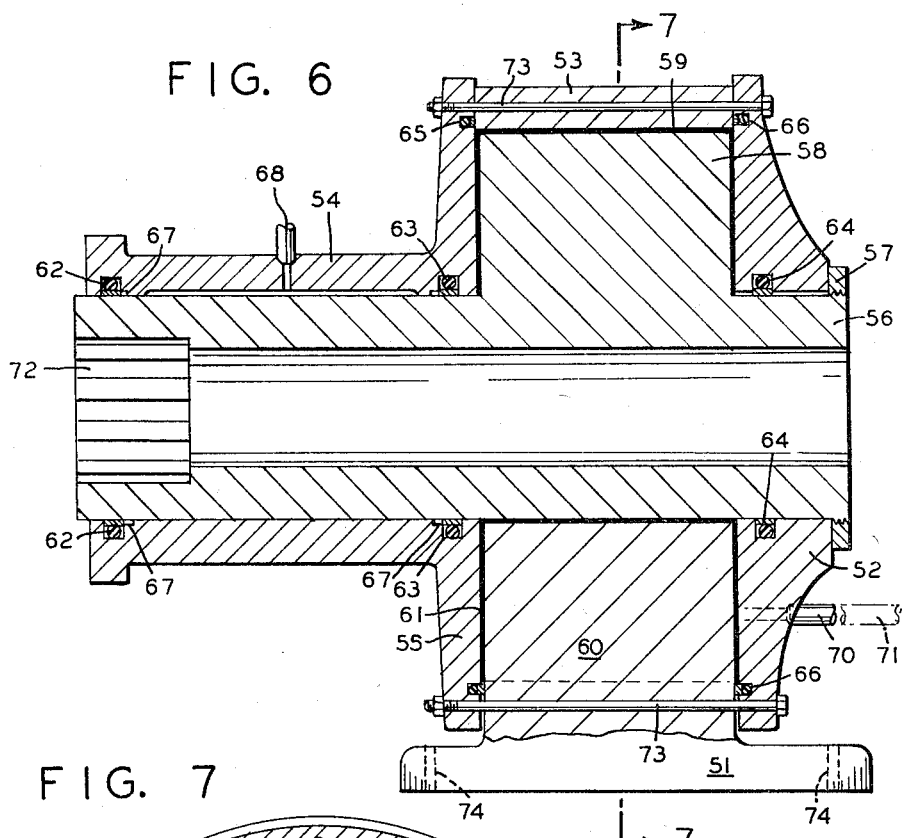
FIG. 6 is a side elevational view in section similar to that of FIG. 3 illustrating an alternate arrangement for a rotary actuator mechanism in accordance with the invention.
Figure 7:
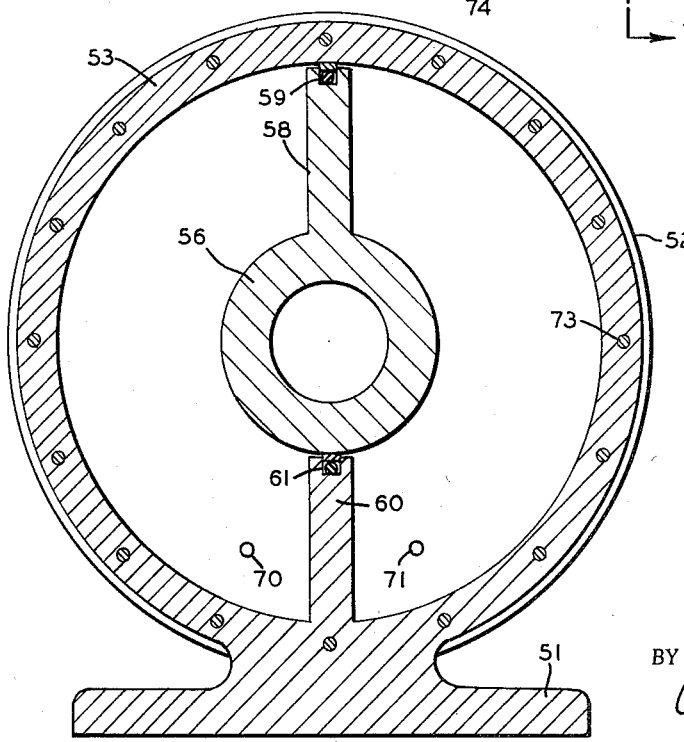
FIG. 7 is a transverse view taken substantially along line 7—7 of FIG. 6.

In the alternate embodiment illustrated in FIGS. 6 and 7 the bearing lock component of the rotary actuator is disposed adjacent to the vane section rather than radially outward therefrom as in the embodiment of FIGS. 3–5. As shown the actuator is composed of a suitable base 51 attached to a left hand end plate 55 and a right hand end plate 52 through an outer housing 53. The output shaft or rotor 56 is centrally located within the right and left hand end plates 52 and 55, respectively. The output shaft 56 contains the rotary vane 58 which rides inside the envelope formed by the right hand and left hand end plates 52 and 55 and the outer housing 53. Dynamic seal 59 is provided on the outer periphery of the rotary vane 58 to prevent cross vane leakage. A stationary vane 60 is affixed to the inner surface of the outer housing 53. A dynamic seal 61 is provided on the outer periphery of the stationary vane to prevent cross vane leakage. An interference fit bearing lock sleeve 54 is integrally formed with the left hand end plate 55 as shown, or the sleeve 54 may be suitably attached to the left hand end plate 55 by suitable means, e.g. by bolting or screw threads so that the interference coupled sleeve cannot rotate with respect to the left hand end plate 55. Rotary seals 62 and 63 are provided within the interference fit sleeve 54 to contain the release fluid within the lock section of sleeve 54. Preferably an annular clearance 67 is formed adjacent seals 62 and 63. A lock nut 57 is provided to restrain the right hand end plate 52. Retaining bolts 73 are employed to secure the right and left hand end plates 52 and 55 to the outer housing 53. Static seals 65 and 66 are employed to contain the hydraulic fluid within the actuator housing. A suitable attaching means such as the spline 72 is provided in the output shaft 56 for connection to adjacent hardware. Mounting holes 74 are provided in the base 51 for securing the actuator to an appropriate base.

In the embodiment of FIG. 6, the actuator is operated by first applying hydraulic pressure to the lock release port 68 which thereby releases the interference fit coupling between the sleeve 54 and rotatable shaft or rotor 56. The members are then relatively rotated by applying hydraulic fluid to either the clockwise direction fluid furnishing port 70 or to the counterclockwise fluid port 71 depending on the direction of rotation desired. Upon reaching the position of rotation desired, the hydraulic pressure is removed from the rotating ports and the lock is re-applied by relieving the hydraulic pressure at port 68. It will be apparent that the arrangement of FIGS. 6 and 7 may alternately comprise one or more rotary and stationary vanes depending on the required output torque, overall size and rotational capability desired.

Figure 8:
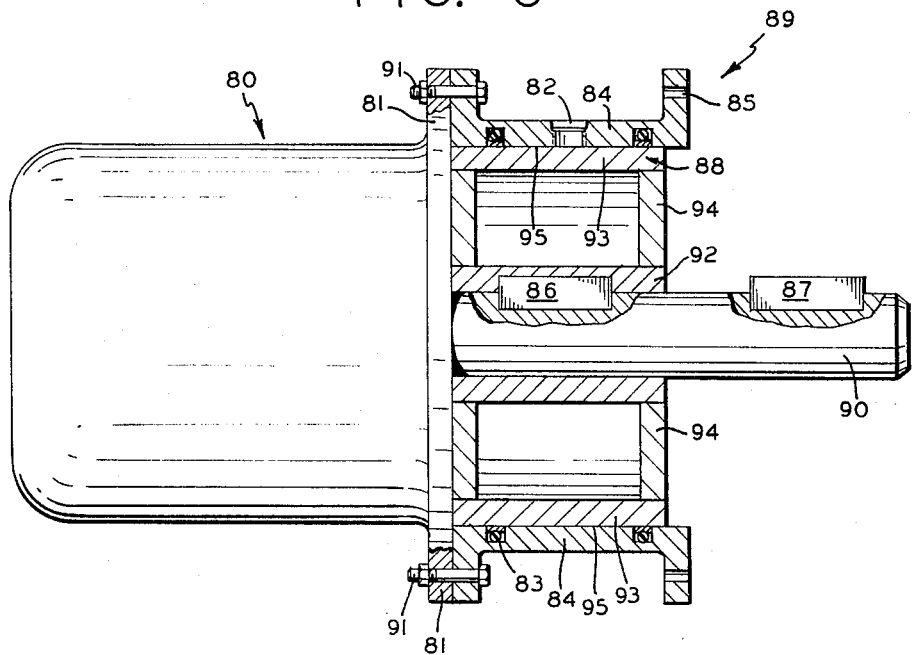
FIG. 8 is a side elevation view partially in section illustrating an alternate arrangement for a rotary mechanism in accordance with the invention employed in conjunction with a prime mover which is shown schematically.

FIG. 8 illustrates, in an alternate embodiment of the invention, a prime mover 80 having output shaft 90 and mounting flange 81 which permits assembly of the prime mover 80 in tandem to the rotary lock assembly 89. The prime mover 80 may be characterized for example as a hydraulic axial piston motor, electric motor, gas driven motor or other type engine in combination with the lock assembly 89. The lock assembly 89 is composed of outer cylindrical member 84, inner cylindrical rotating member 88 and two dynamic seals 83. The rotating member 88 is illustrated as an integral element but may comprise two concentric sleeves 92 and 93 suitably joined with side members 94. The assembly arangement 89 provides a sealed chamber 95 between the two cylindrical members 84 and sleeve 93 of member 88 that is pressurized by port 82. Fluid pressure introduced at 82 relieves the interference at 95 between annular peripheral surface of 88 and inner peripheral surface of 84 uncoupling the interference fit. The inner cylindrical member 88 is connected to the shaft prime mover and output shaft 90 by any suitable means such as key 86. The outer cylindrical member 84 is affixed to the prime mover flange 81 by any suitable means such as bolts 91. The combined assembly of prime mover 80 and locking nut 89 may then be applied in tandem a mechanism (not shown) sought to be driven, by conveniently securing it as by bolting at 85. Power is then transmitted from the prime mover 80 to the driven mechanism through any suitable interlocking mechanism attached to shaft 90 such as by key 87 on shaft 90.

When so adapted the mechanism being driven may be readily locked when stopped by locking assembly 89. When the mechanism is to be driven, the bearing lock is disengaged by applying fluid pressure to point 82 expanding sleeve 84. This uncouples the interference fit between the inner surface of 84 and outer surface of 93, thus permitting relatively unrestricted rotation of prime mover output shaft 90. An arrangement of this kind has utility in various applications. For example, the mechanism to be driven may be a spur gear box which is reversably rotatable as in a winch or hoist and the prime mover and lock assembly as described in FIG. 8 may be employed to alternately drive such mechanism and to lock it securely against movement in any of an infinite number of positions, i.e. at various heights without danger of reversing under the force of the load lifted.

Various additional modifications may be made in the teaching presented without departing from the scope of the invention. Accordingly, the invention is not to be limited to details except insofar as necessitated by the appended claims.

We claim:

1. A mechanism for imparting rotary movement comprising a cylindrical stator member, a rotor mounted within said stator, said stator being provided with a central hub, and normally held against movement relative to said rotor by an interference coupling between the outer face of said rotor and the inner face of said stator, at least one operating vane mounted on the interior of said rotor and extending inwardly therefrom into close proximity with the hub of said stator, at least one operating vane carried by said hub and extending outwardly therefrom into close proximity with the inner surface of said rotor, means for introducing fluid under pressure at said interface to expand said stator relative to said rotor and thereby uncouple said rotor from said stator, and means operative when said rotor is uncoupled from said stator acting on said vanes to effect relative rotational movement between said stator and said rotor.

2. The invention defined in claim 1 wherein a plurality of sets of coacting vanes are carried by said stator and said rotor and wherein said means for effecting relative rotary movement between said rotor and stator comprise conduits operative to introduce fluid under pressure into engagement with selected faces of said sets of vanes to thereby move said rotor in a selected direction.

References Cited by the Examiner
UNITED STATES PATENTS

| | | | |
|---|---|---|---|
| 2,918,298 | 12/1959 | Starr | 280—43.23 |
| 3,017,807 | 1/1962 | Grover | 92—120 |
| 3,150,571 | 9/1964 | Frassetto et al. | 92—28 |

FOREIGN PATENTS 716,776  10/1954  Great Britain.

BENJAMIN HERSH, *Primary Examiner.*

C. C. PARSONS, *Assistant Examiner.*